United States Patent [19]

Stearns

[11] Patent Number: 5,130,727
[45] Date of Patent: Jul. 14, 1992

[54] FEEDBACK SCHEME FOR IONOGRAPHIC CALIBRATION

[75] Inventor: Richard G. Stearns, Mountain View, Calif.

[73] Assignee: Xerox Corporation

[21] Appl. No.: 633,883

[22] Filed: Dec. 26, 1990

[51] Int. Cl.$^5$ ............................................. G01D 15/06
[52] U.S. Cl. .................................... 346/159; 346/155
[58] Field of Search ........................ 346/154, 155, 159

[56] References Cited

U.S. PATENT DOCUMENTS 5,003,327 3/1991 Theodoulou et al. .............. 346/154

Primary Examiner—Benjamin R. Fuller
Assistant Examiner—Randy W. Gibson
Attorney, Agent, or Firm—Anglin & Giaccherini

[57] ABSTRACT

The present invention is a method and apparatus which solves the problem of rapidly calibrating to a uniform value, the ion current (i) associated with each modulation electrode (50) of a print array (40) in an ionographic printing head (10). The calibration data may then be used during printing to produce high quality images of uniform density. The present invention employs a calibration array (30) positioned to sense the ion current (i) associated with each opposing modulation electrode (50) as a voltage (V(i)) across a calibration electrode (70) load resistance (R). When the instantaneous value of ion current (i) and the desired calibrated ion current ($i_F$) differ when presented to a comparator, a feedback circuit (62) feeds back an error voltage ($V_{INT}$) to a driver (100) coupled to the modulation electrode (50). The modulation voltage (Vm(i)) and the error voltage ($V_{INT}$) are combined at the driver (100) input, producing a calibrated modulation voltage (Vm(i)') which adjusts the ion current (i) to the calibrated value. Calibrated modulation voltage (Vm(i)') is read and stored for later use during the printing, or used in real time depending on the time constants of the feedback circuit (62) and the speed of printing desired. Voltage (V(i)) indicative of calibrated ion current ($i_F$) may also be read if desired.

9 Claims, 4 Drawing Sheets

FEEDBACK SCHEME FOR IONOGRAPHIC CALIBRATION

CROSS REFERENCE

Cross reference is made to U.S. Pat. No. 4,972,212, entitled "METHOD AND APPARATUS FOR CONTROLLING ION TRAJECTORY PERTURBATIONS IN IONOGRAPHIC DEVICES", issued to Oscar G. Hauser, et al. and assigned to the same assignee as the present application, and to U.S. Pat. No. 4,973,994, entitled "METHOD AND APPARATUS FOR CONTROLLING ION TRAJECTORY PERTURBATIONS IN IONOGRAPHIC DEVICES", issued to Eric J. Schneider, and assigned to the same assignee as the present application.

INCORPORATION BY REFERENCE

The United States Patents referred to above as Cross References and U.S. Pat. No. 4,644,373 issued to Sheridon, et al. are all incorporated herein by reference.

BACKGROUND OF THE INVENTION

The present invention is a method and apparatus that provides a system for calibrating the ion current projected past each modulation electrode of an ionographic printing head to achieve a uniform value of current past each electrode. Uniformity of ion current under conditions of a known modulation voltage is important in producing high quality printed images, particularly those in which a grey scale is desired. Non-uniform densities of ion current flowing past each modulation electrode often result in unacceptable variations in printed image density.

Ionographic printing is that type in which charged particles are created at a remote location from the point at which a charge latent image is formed on a dielectric surface of a conductive substrate receptor. A stream of ions, assisted in some known systems by a fluid stream, generally an air stream, passes through a channel in the print head in which is placed a linear array of modulation electrode fingers, one for each pixel in a line of the printed image. Ions are created in a chamber, for example, by electrical discharge from a corona wire, maintained at very high positive voltage. During the printing process, the stream of ions is projected toward the receptor, usually a drum, which is placed at a high, negative electrical potential so as to attract the ions to its dielectric surface. Those ions which are projected from the printing head are pulled to the dielectric, over-coated surface of the receptor where they form a charge image, ready for immediate Xerographic-type development into a printed image. Application of low, modulation voltages to the electrode fingers can deflect the ions and locally eliminate them from the stream, producing varying densities of ions and thus varying density of the subsequently printed image.

In high-quality ionographic printing, particularly where grey-levels are used, unless non-uniformities of each of the ion steams are corrected, unacceptable variations in the printed image density occur. Prior art has addressed the problem of controlling ion perturbation at the imaging surface caused by the effect of previously deposited ions on the path of subsequent ions directed toward the imaging surface. The present invention is directed to compensating for dimensional and electrical variations in the ionographic printing head which cause non uniformity of individual ion streams across the width of the printing head. As used herein, "calibrating" is the process of making the ion stream flowing past each modulation electrode uniform for a desired value of modulation voltage. In calibrating the output of an ionographic head, it is desirable to calibrate at one time as many modulation electrodes as possible, because of the large number involved. For example, a printing head for an eight and one-half inch wide page, at a resolution of 300 spots per inch, might contain 2,560 modulation electrodes.

The problems of eliminating mechanical scanning and of rapidly calibrating a large array of modulation electrodes in an ionographic head have been major ones for designers of ionographic printing devices. The development of a direct way to insure uniform ion flow in spite of variations in the construction of ionographic printing heads would be a major technological advance and fill a long felt need in electronic printing.

SUMMARY OF THE INVENTION

The present invention is a method and apparatus which solves the problem of rapidly adjusting or "calibrating" to a uniform value, the ion current associated with each modulation electrode of an ionographic printing head for a given modulation voltage. The calibration data may then be used during the printing process to correct ion current from each modulation electrode so as to produce high quality images of uniform density. The present invention employs a calibration array placed in opposition and close proximity to the printing head array so that a calibration electrode will intercept the ion current from each opposing modulation electrode. The ion current is sensed as a voltage across a load resistance of several hundred meg-ohms value. The invention utilizes a feedback circuit consisting of a comparator, an opto-coupler, and an integrator, to feed back an error voltage to a modulation electrode driver, when the instantaneous value of ion current differs from the desired calibrated value. The voltage across the load resistance is compared in a comparator circuit with a value of calibration voltage derived from a fixed value of calibrated ion current. Several values over a range of calibrated ion current may be selected for repetitive calibration. The output of the comparator is integrated, and fed back as an error voltage to the input of the driver which modulates the modulation electrode corresponding to the calibration electrode. By combining the modulation voltage and the error voltage, the modulation electrode driver adjusts the ion current to the desired, calibrated value. Each calibrated ion current is associated with a calibrated modulation voltage at the driver output. The values of calibrated modulation voltage are read, correlated with the calibrated ion current, and stored for later use during the actual printing process, or used in real time depending on the time constants of the feedback circuit and the speed of printing desired. The feedback loop may be reset to a starting point by momentarily shorting the integrating circuit capacitor with a switch.

In practical embodiments, the feedback circuits would be multiplexed in a manner which matches the number of calibration electrodes which can be addressed at one time in order to read and store voltage data. Alternatively, an analog-to-digital convertor could be used for each feedback circuit.

An appreciation of other aims and objectives of the present invention an a more complete understanding of

DETAILED DESCRIPTION OF A PREFERRED EMBODIMENT

Figure 1:
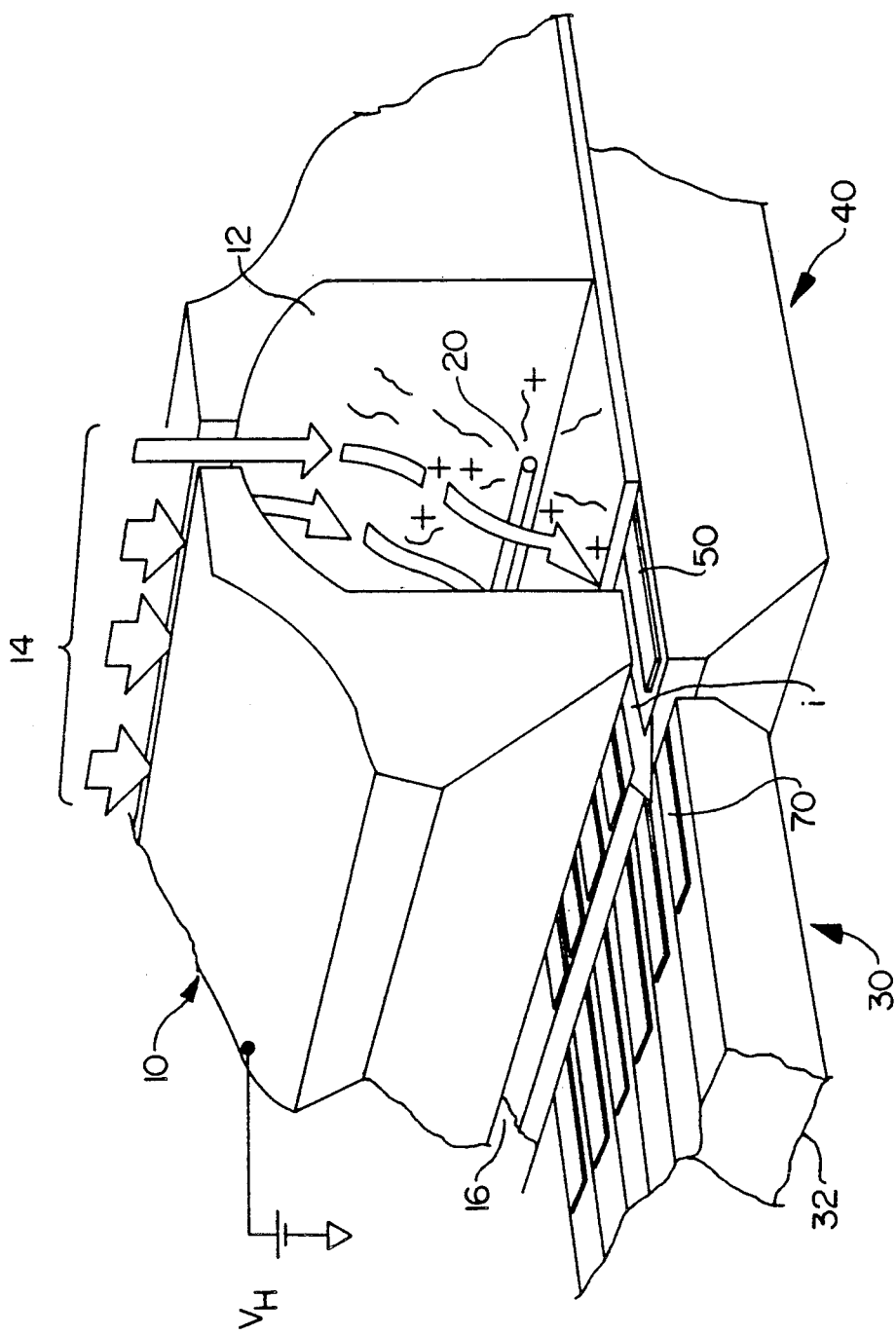
FIG. 1 is a perspective view of a preferred embodiment of the calibration array employed by the invention arranged with a conventional ionographic printing head.

FIG. 1 depicts a preferred embodiment of the calibration array (30) employed by the invention arranged with an ionographic printing head (10) of a fluid jet assisted marking apparatus similar to that described in commonly assigned US-A No. 4,644,373 to Sheridan et al. Within head (10) is an ion generation region including an ion chamber (12) and a corona wire (20), supported within the chamber and supplied with a high potential on the order of several thousand volts D.C. The corona discharge around corona wire (20) creates a source of ions of a given polarity (preferably positive) which are attracted to the chamber wall held at a potential of $V_H$, and fill the chamber with a space charge.

A pressurized transport fluid (14), preferably air, from a suitable source is introduced to the ion chamber (12). A modulation channel (16) directs the transport fluid (14) out of the chamber (12). As the transport fluid (14) passes through the ion chamber (12) it entrains ions and moves them into the modulation channel (16) past modulation electrodes (50). During the printing process, ions are allowed to pass out of the head (10), through the modulation channel (16) and are directed toward a receptor dielectric surface where they form a charge image, ready for Xerographic-type development into a printed image. To form an image, the modulation electrodes (50) are individually switched to locally eliminate ions from the ion stream. The resultant ion current (i) is attracted to the receptor. The switching arrangement may produce a binary image, for example black and white, or grey levels may be introduced by providing a continuously variable modulation voltage to the modulation electrodes (50). The modulation electrodes (50) are arranged in a print array (40) constructed as a thin film layer supported by an insulating substrate.

A calibration array (30) of calibration electrodes (70) also constructed on a thin film layer and supported by an insulating substrate (32) in a manner similar to the modulation electrodes (50), is arranged in alignment with and opposite to the modulation electrodes (50). Each calibration electrode (70) is positioned to intercept a flow of ion current (i) out of the head (10) associated with a respective modulation electrode (50). Because each modulation electrode (50) and each calibration electrode (70) are essentially independent, the discussion which follows is limited to a single combination of modulation electrode (50), corresponding calibration electrode (70), feedback circuit (62) and modulation electrode (50) driver (100).

Figure 2:
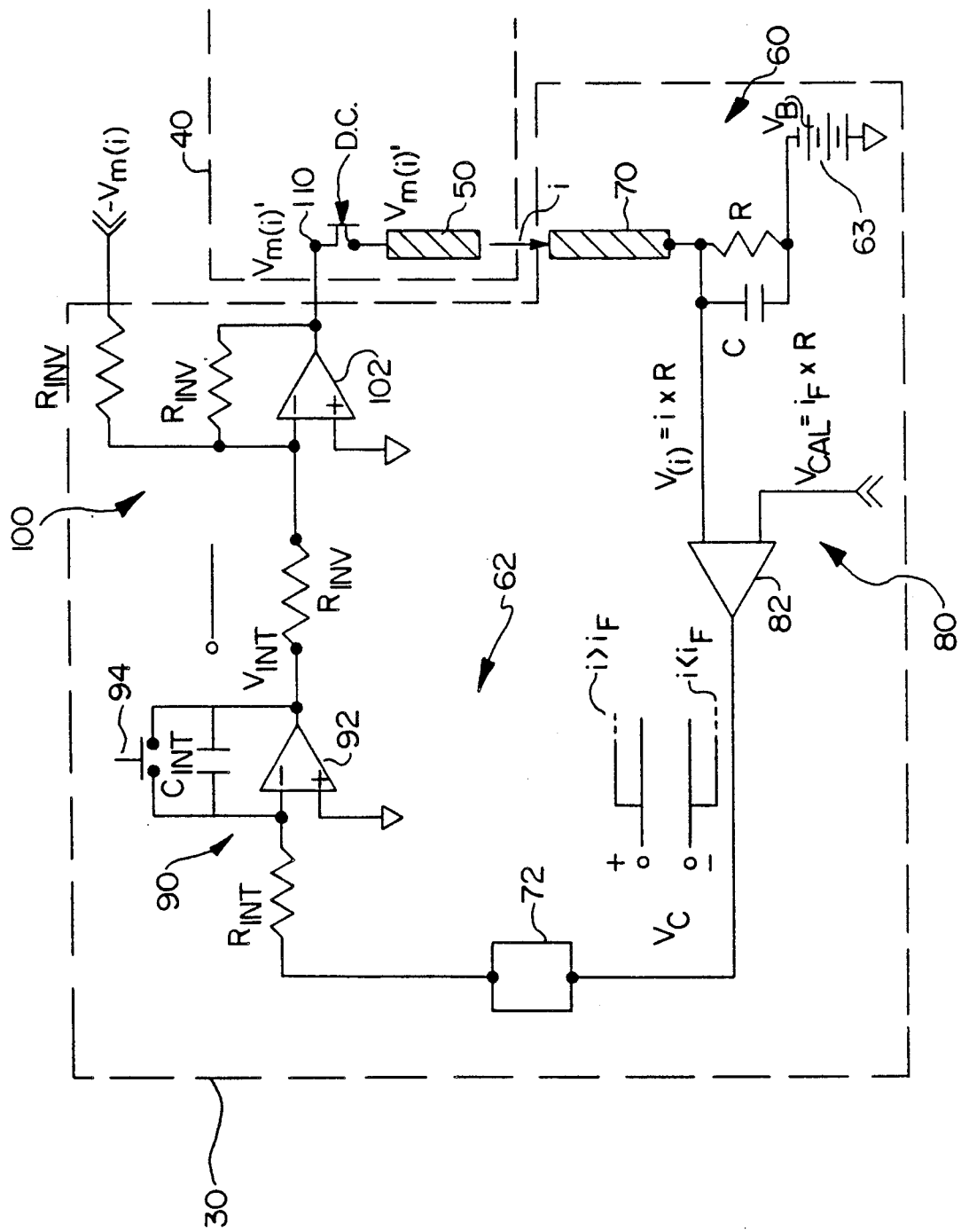
FIG. 2 is a schematic diagram of the circuitry employed by the Feedback Scheme for Ionographic Calibration for a typical combination of modulation electrode and opposing calibration electrode.

FIG. 2 is a schematic diagram of the circuitry employed by the invention for a typical combination of calibration electrode (70), modulation electrode (50), feedback circuit (62), and driver (100). The modulation electrode (50) is driven by a varying modulation voltage (Vm(i)). In the embodiment depicted, a negative Vm(i) applied to the input of an inverting/summing amplifier (102) will produce a positive Vm(i) at the modulation electrode (50). The calibration electrode (70) is biased at a high potential, preferably negative at about 1000 volts D.C., to attract the ion current (i) allowed to pass the modulation electrode (50). It is an object of the invention to achieve, for a given value of modulation voltage (Vm(i)), a uniform value of ion current (i) associated with each modulation electrode (50).

At the start of calibration, a desired modulation voltage (Vm(i)) is applied to each modulation electrode and an ion current (i) flows from the head (10) to the calibration electrode (70). The value of ion current (i) may vary from electrode (70) to electrode (70) in the calibration array (30) influenced mainly by variations in the manufacture of the printing head (10). The instantaneous value of ion current (i) associated with each modulation electrode (50) is read as a voltage (Vi) between a load resistance R and ground of the calibration array (30) and is applied to an input of a comparator circuit (80). The other input to the comparator circuit (80) is a fixed value of voltage ($V_{CAL}$) selected for calibration. This calibration voltage ($V_{CAL}$) will have a value related to the uniform value of calibrated ion current ($i_F$) which is to be achieved, defined by $i_F \times R$. A range of values corresponding to the range of ion current used for printing may be used for values of calibrated ion current ($i_F$). It should be appreciated that to achieve a high degree of uniformity of calibrated ion current ($i_F$), all of the load resistances (R) in the calibration array (30) must be well matched. Resistors may be fabricated using current thin film technology and trimmed to the same value of resistance by use of a laser. It can be seen that it is not crucial to the operation of the invention that a particular value of resistance be achieved, only that each resistance (R) be the same.

The comparator (80) produces a binary output ($V_c$) the states of which depend on whether the instantaneous value of ion current (i) is greater or less than the value of calibration current ($i_F$). For example, if an instantaneous value of ion current (i) is greater than the calibrated value of ion current ($I_F$), output ($V_C$) will be positive, and vice versa. The comparator (80) output ($V_C$) is next fed into an optocoupler (72) which brings the ground potential of the comparator (80) (for example, minus 1000 Volts D.C.) to the ground potential ($V_H$) of the head (10). An integrator circuit (90) is placed at the output of the opto-coupler (72) which smoothes the comparator (80) output ($V_C$). The integrator (90) may be an amplifier (92) with an appropriate input resistor ($R_{INT}$) and a capacitor ($C_{INT}$). The integrator (90) may also be provided with a switching device (94) which can be used to reset the feedback circuit (62) to zero volts by shorting the capacitor ($C_{INT}$). A field effect transistor may be used for this switch. The integrator (90) will normally have an output which is called herein an "error voltage" ($V_{INT}$). The error voltage ($V_{INT}$) is fed to the driver (100) where it is combined with the desired modulation voltage (Vm(i)) at the input of the inverting/summing amplifier (102). The error voltage ($V_{INT}$) indicates the difference between instantaneous ion current (i) and final, calibrated ion current ($i_F$). The error voltage ($V_{INT}$) will increase up to the point where the instantaneous value of ion current (i) equals the calibrated ion current ($i_F$). The driver (100) operates to combine the modulation voltage (Vm(i)) applied at the input of the inverting/summing amplifier (100) and the error voltage ($V_{INT}$) also applied at the input of the inverting/summing amplifier driver (102) and supplies a calibrated modulation voltage (Vm(i)') to the modulation electrode (50), which regulates the ion current (i) to the final, calibrated value of ion current ($i_F$). A filter capacitor (C) may be provided in parallel with the load resistance (R) to obtain low-pass filtering of any fluctuations of ion current (i).

At such time as the feedback circuits have stabilized the system at the calibrated ion current ($i_F$), the values of calibrated modulation voltage (Vm(i)') at the output of each inverting/summing amplifier (102) are read and stored for later use during the actual printing process, or used in real time depending on the time constants of the feedback circuit and the speed of printing desired. The values of voltage (V(i)), which indicate calibrated ion current (i), may also be read if desired.

Depending on the number of modulation electrodes (50) to be calibrated, a large number of analog-to-digital converters may be used for reading for storage, values of the voltages (Vm(i)'), (V(i)). Alternatively, an arrangement for multiplexing the voltage data may be employed. Alternate embodiments depend on the number of modulation electrodes (50) that are addressable at one time through the printing head apparatus (10). Similar choices are available for reading out the calibration electrode (70) voltage (V(i)) and are discussed further below.

The comparator integrated circuit (82) may be replaced by a simpler differential amplifier in the event an analog opto-coupler is substituted for the preferred binary opto-coupler (72). Some improvement in feedback efficiency and reduction in noise would be possible if a differential amplifier were used. Ideally, the comparators (80) (or differential amplifiers if they are employed) would be built on the calibration array (30) substrate (32). This depends on the availability of appropriate fabrication techniques for large-area silicon electronics.

Figure 3A:
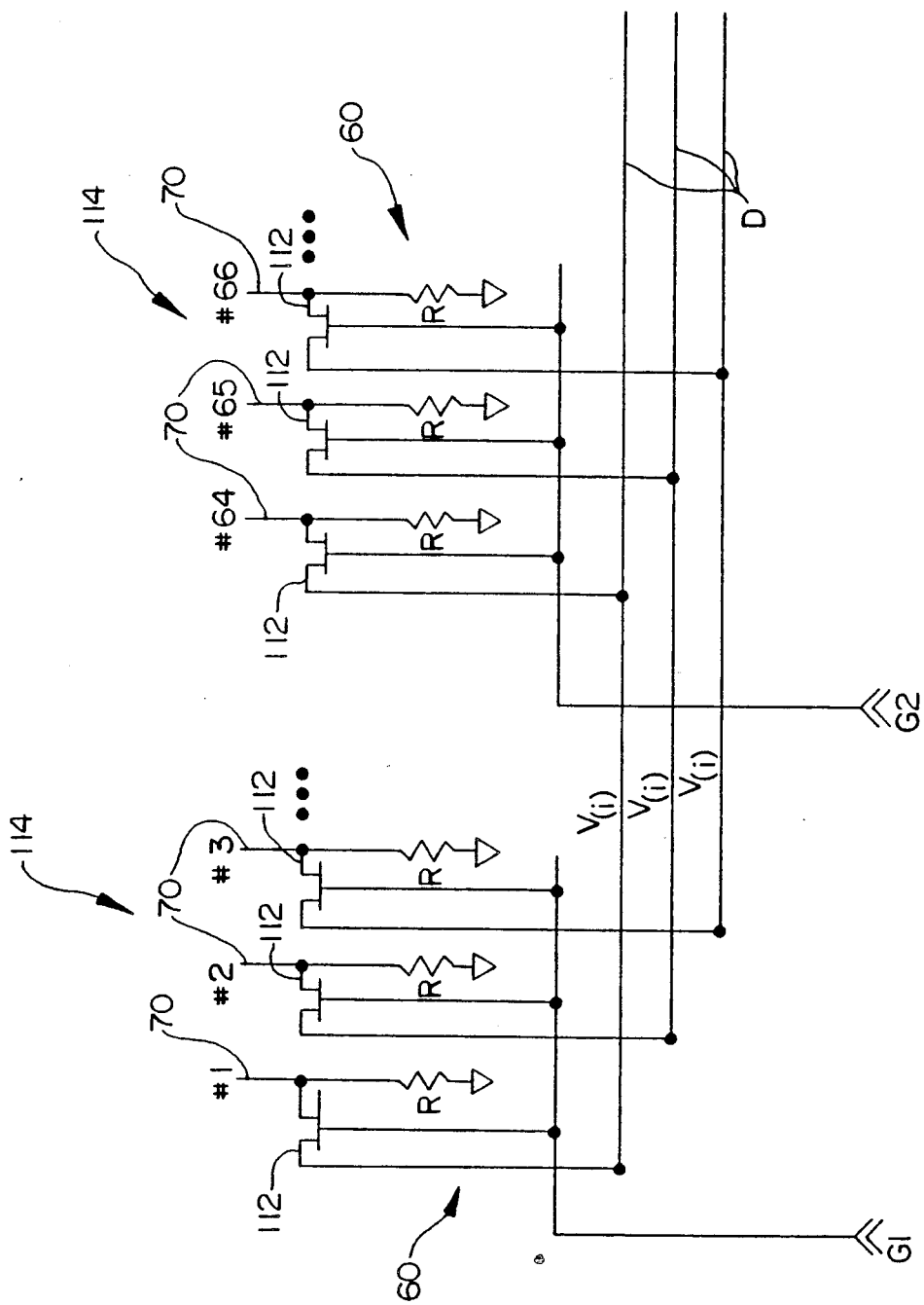
FIG. 3(a) is a schematic drawing of an alternative embodiment of the calibration array which employs a multiplexing arrangement at the ion sensors to reduce the number of feedback circuits to a sub-multiple of the number of calibration electrodes employed.

FIG. 3(a) depicts an embodiment of the calibration array (30) which may be used to reduced the total number of comparator and feedback circuits (80), (62). In that embodiment, 64 calibration electrodes (70) in each of 40 groups (114) would be addressable at one time. FIG. 3(a) depicts schematically two of the 40 groups. This arrangement corresponds, for example, with the arrangement of modulation electrodes (50) in an ionographic head (10) known as the "Corjet" ionographic printing head (10). In this arrangement, a typical data line (D) from each calibration electrode passes through a thin film transistor switch (112). Sixty four calibration electrodes (70), for example, those numbered 1 through 64, would be addressed at one time by applying an appropriate voltage to the first gate line (G1) which turns on the first 64 transistor switches (112) and at the same time applying an appropriate voltage to the all other gate lines which turns off all other transistor switches (112). The voltage (Vi) at each load resistance (R) may then be read. Following the first group (114) of 64 calibration electrodes (70) to be addressed, the second group (114) would be addressed by applying an appropriate voltage to the second gate line (G2). Each remaining group of 64 calibration electrodes (70) would be addressed in like manner, in turn, until all of the calibration electrodes (70) have been addressed.

Figure 3B:
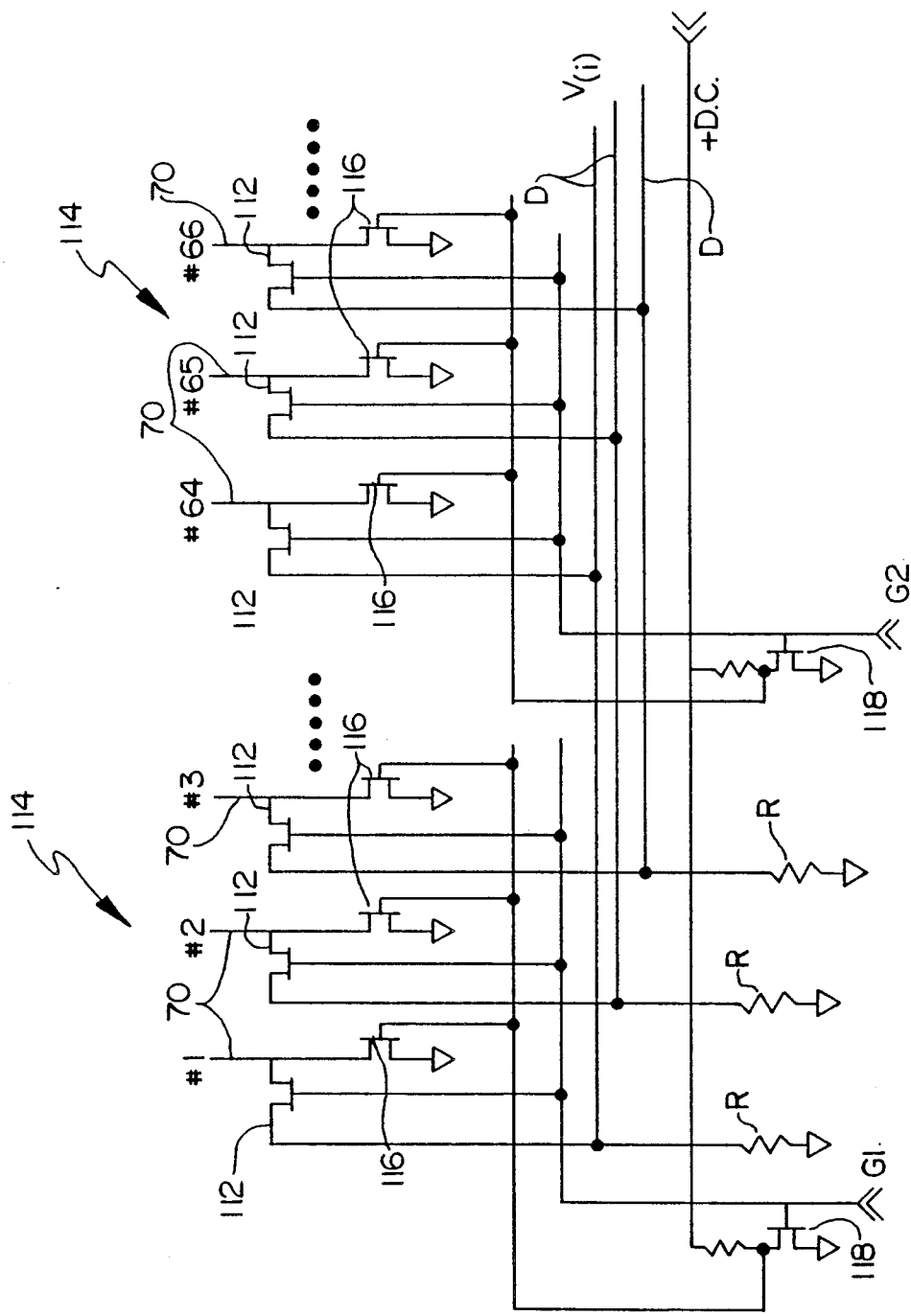
FIG. 3(b) is a schematic diagram of an alternative embodiment of the calibration array which employs a multiplexing arrangement at the ion sensors to reduce the number of feedback circuits to a sub-multiple of the number of calibration electrodes and to reduce the number of load resistances one per group of multiplexed electrodes.

FIG. 3(b) is another alternative embodiment of a multiplexing scheme for the calibration array (30) which requires only 64 load resistances (R) for a print array (40) of 2560 calibration electrodes (70). Reducing the number of load resistances (R) would have a favorable impact on the cost of producing a calibration array (30). In this embodiment, each calibration electrode (70) of a group (114) is connected, respectively, to one of 64 load resistances (R) through a thin film transistor switch (112). Thin film transistor switches (116) connect the calibration electrodes (70) to ground potential by action of thin film transistor switch (118). An appropriate voltage applied to the gates of the transistor switches (112), (116) by the first gate line (G1) turns on the first group (114) being addressed. Appropriate voltages applied to all other gate lines, for example second gate line (G2), turns off all other groups (114). Calibration of each group (114) is then carried on as described above.

Another alternative embodiment would eliminate the need for a calibration array (30) separated from the ionographic head (10). A set of short calibration electrodes (70) would be placed just downstream and on the same substrate as the modulation electrodes (50). In normal printing operation, the calibration electrodes (70) would be maintained at ground potential ($V_H$) of the head (10). When it was desired to calibrate the head (10), the calibration electrodes (70) would be biased to a high negative potential and the calibration process would proceed as described earlier.

LIST OF REFERENCE NUMERALS

FIG. 1

10 Ionographic printing head
12 Ion chamber
14 Air flow
16 Modulation channel
20 Corona wire
30 Calibration array FIG. 1, continued
32 Substrate
40 Print array
50 Modulation electrode (typ)
70 Calibration electrode (typ)
i Ion current
$V_H$ Reference potential

FIG. 2

30 Calibration array
40 Print array
50 Modulation electrode
60 Ion sensor
62 Feedback circuit
63 Bias voltage supply
70 Calibration electrode
72 Opto-coupler
80 Comparator
82 Comparator integrated circuit or differential amplifier 90 Integrator
92 Integrator amplifier
94 Reset switch
100 Driver
102 Inverting/summing amplifier
110 Thin film transistor switch
C Filter capacitor
i ion current
$i_F$ Calibrated ion current
R Load resistor FIG. 2, continued
$R_{INV}$ Driver resistors
$V_B$ Bias voltage supply
$V_C$ Comparator output voltage
$V_{CAL}$ Fixed calibration voltage
V(i) Instantaneous voltage at load resistor R
$V_{INT}$ Error voltage (integrator output voltage)
Vm(i) Modulation voltage
Vm(i)' Calibrated modulation voltage
$V_F$ Error voltage

FIG. 3(a)

70 Calibration electrode
112 Thin film transistor switch
114 Calibration electrode group
D Data line (typ.)
G1 First gate line
G2 Second gate line
V(i) Instantaneous value of voltage at load resistance R

FIG. 3(b)

70 Calibration electrode
112 Thin film transistor switch
114 Calibration electrode group
116 Thin film transistor switch
D Data line (typ.)
G1 First gate line
G2 Second gate line
V(i) Instantaneous value of voltage at load resistance R

What is claimed is:

1. An apparatus for achieving a uniform value of calibrated ion current ($i_F$) projected past each one of a plurality of modulation electrodes (50) of an ionographic printing head (10) having a source of ions moving in a stream through a channel (16) in which a print array (40) of said modulation electrodes (50) is positioned and each one of said modulation electrodes (50) is individually biased by a modulation voltage (Vm(i)) to modulate said stream flowing therepast and from said printing head (10) as an ion current (i) to form a charge image on a dielectric surface of an electroreceptor, comprising:

a plurality of calibration array means (30) for comparing instantaneous values of said ion current (i), flowing past each one of said modulation electrodes (50), with a fixed value of calibrated ion current ($i_F$) and adjusting each said instantaneous value of said ion current (i) to equal said calibrated ion current ($i_F$), each one of said calibration array means (30) comprising:

a sensing means (60) for sensing an instantaneous value of said ion current (i) flowing past one of said modulation electrodes (50), said sensing means (60) having a negatively-biased calibration electrode (70) positioned to intercept said ion current (i), a load resistance (R) and a filter capacitance (C);

a comparator means (80) for comparing said instantaneous value of ion current (i) with a fixed value of calibrated ion current ($i_F$) and producing an output voltage (Vc) from said comparator means (80) when said fixed value of calibrated ion current ($i_F$) differs from said instantaneous value of said ion current (i);

a feedback means (62) for feeding back said output voltage (Vc) from said comparator means (80) and producing an error voltage ($V_{INT}$); and a driver means (100) for combining said error voltage ($V_{INT}$) and a corresponding said modulation voltage (Vm(i)) and producing a calibrated modulation voltage (Vm(i)) to be applied to a corresponding one of said modulation electrodes (50);

said sensing means (60) coupled directly to said comparator means (80), said comparator means (80) coupled to said driver means (100) through said feedback means (62); and said load resistance (R) and said filter capacitance (C) coupled from said calibration electrode (70) to a bias voltage supply (63).

2. An apparatus as claimed in claim 1 in which said feedback means (62) comprises:

an opto-coupler (72); and an integrator means (90) for integrating said output voltage (Vc) of said comparator means (80) and producing an error voltage ($V_{INT}$);

said integrator means (90) having an input coupled to said comparator means (80) through said opto-coupler (72) and having an output coupled to said driver means (100).

3. An apparatus as claimed in claim 1 in which said driver means (100) comprises an inverting/summing amplifier (102).

4. An apparatus as claimed in claim 1 in which said load resistance (R) comprises a thin film resistor (R).

5. An apparatus for achieving a uniform, calibrated ion current ($i_F$) projected from an ionographic printing head (10) having a source of ions moving in a stream through a channel (16) in which a print array (40) of modulation electrodes (50) is positioned and individually biased by a modulation voltage (Vm(i)) to modulate said stream flowing from said printing head (10) as an ion current (i) to form a charge image on a dielectric surface of an electroreceptor, comprising:

a plurality of ion sensors (60) each of said ion sensors (60) having a negatively-biased electrode (70) positioned to intercept said ion current (i), a load resistance (R) and a filter capacitance (C);

a plurality of comparator circuits (82) each of said comparator circuits (82) having an input connected to each of said ion sensors (60) and an input connected to a fixed calibration voltage ($V_{CAL}$) associated with said calibrated ion current ($I_F$), and each of said comparator circuits (82) having an output voltage (Vc) when said calibrated ion current ($i_F$) differs from said instantaneous value of ion current (i);

a plurality of opto-couplers (72);

a plurality of integrator amplifiers (92) each of said integrator amplifiers (92) having a reset switch (94) arranged across an input and output terminal; and a plurality of inverting/summing amplifiers (102);

each of said comparator circuits (80) coupled serially through each of said opto-couplers (72), each of said integrator amplifiers (92), and each of said inverting/summing amplifiers (102) to each of said modulation electrodes (50).

6. An apparatus as claimed in claim 5 in which said resistance (R) comprises a thin film resistor.

7. A method of calibration to achieve a uniform value of calibrated ion current ($i_F$) projected past each one of a plurality of modulation electrodes (50) of an ionographic printing head (10) having a source of ions moving in a stream through a channel (16) in which a print array (40) of modulation electrodes (50) is positioned and each one of said modulation electrodes (50) is individually biased by a modulation voltage (Vm(i)) to modulate said stream flowing therepast and from said printing head (10) as an ion current (i) to form a charge image on a dielectric surface of an electroreceptor, comprising the steps of:

positioning each one of a plurality of ion sensors (60) adjacent to a respective one of said modulation electrodes (50) to intercept said ion current (i) flowing therepast and negatively biasing each one of said ion sensors (60) with respect to ground potential of said printing head (10);

sensing said ion current (i) with each respective one of said ion sensors (60);

comparing an instantaneous value of said ion current (i) flowing past each one of said plurality of modulation electrodes (50) and a fixed value of said calibrated ion current ($i_F$) in a plurality of comparators (80) and producing an output voltage ($V_C$) when said instantaneous value of said ion current (i) and said fixed value of said calibration current ($i_F$) are different;

feeding back said output voltage ($V_C$) from each one of said comparators (80) as an error voltage ($V_{INT}$) to each one of a plurality of drivers (100); and combining said error voltage ($V_{INT}$) and a respective said modulation voltage (Vm(i)) in each one of said drivers (100), and producing a calibrated modulation voltage (Vm(i)) for each one of said modulation electrodes (50);

applying said calibrated modulation voltage (Vm(i)) at each one of said modulation electrodes (50), thereby adjusting said instantaneous value of ion current (i) flowing past each one of said modulation electrodes (50) to equal said calibrated ion current ($i_F$).

8. A method of calibration to achieve a uniform value of calibrated ion current ($i_F$) projected past each one of a plurality of modulation electrodes (50) of an ionographic printing head (10) having a source of ions moving in a stream through a channel (16) in which a print array (40) of modulation electrodes (50) is positioned and each one of said modulation electrodes (50) is individually biased by a modulation voltage (Vm(i)) to modulate said stream flowing therepast and from said printing head (10) as an ion current (i) to form a charge image on a dielectric surface of an electroreceptor, comprising the steps of:

positioning each one of a plurality of negatively-biased calibration electrodes (70) adjacent to each one of said modulation electrodes (50) to intercept said ion current (i);

sensing an instantaneous value of voltage (V(i)) across a load resistor (R) of each one of said calibration electrodes (70) through which said ion current (i) is passed;

comparing, in a plurality of comparators (80), said instantaneous value of ion current (i) with said value of calibrated ion current ($I_F$) and producing an output voltage (Vc) at each one of said comparators (80) indicative of a difference between said instantaneous value of ion current (i) and said fixed value of calibrated ion current ($i_F$);

integrating said output voltage (Vc) at each one of said comparators (80) in one of a plurality of integrating circuits (90) and producing therefrom a smoothed error voltage ($V_{INT}$);

combining said smoothed error voltage ($V_{INT}$) with a respective said modulation voltage (Vm(i)) in one of a plurality of inverting/summing amplifiers (102) and producing a calibrated modulation voltage therefrom; and applying said calibrated modulation voltage (Vm(i)) at each of said modulation electrodes (50), thereby adjusting said instantaneous value of said ion current (i) to equal said uniform value of said calibrated ion current ($i_F$).

9. A method of calibration to achieve a uniform value of calibrated ion current ($i_F$) projected from an ionographic printing head (10) having a source of ions moving in a stream through a channel (16) in which a print array (40) of modulation electrodes (50) is positioned and individually biased by a modulation voltage (Vm(i)) to modulate said stream flowing from said printing head (10) as an ion current (i) to form a charge image on a dielectric surface of an electroreceptor, comprising the steps of:

providing a plurality of ion sensors (60), each of said ion sensors (60) having a negatively-biased calibration electrode (70) positioned to intercept said ion current (i);

providing a plurality of comparator circuits (82), each of said comparator circuits (82) having an input connected to each of said ion sensors (60) and an input connected to a fixed calibration voltage ($V_{CAL}$) derived from said calibrated ion current ($I_F$), and each of said comparator circuits (82) having an output voltage (Vc) when said calibrated ion current ($i_F$) differs from said instantaneous value of ion current (i);

providing a plurality of opto-couplers (72), integrator amplifiers (92), inverting/summing amplifiers (102), each of said integrator amplifiers (92) having a reset switch (64) arranged across an input and output terminal, each of said inverting/summing amplifiers (102) being connected to each of said integrator amplifiers (92) and to each of said modulation electrodes (50);

applying a modulation voltage (Vm(i)) to an input terminal of each of said inverting/summing amplifiers (102) thereby driving each of said modulation electrodes (50) and modulating to an instantaneous value, each said ion current (i);

feeding back the output voltage (Vc) of each of said comparator circuit (82) through each of said opto-couplers (72), through each of said integrator amplifiers (92) producing an error voltage ($V_{INT}$) at an input terminal of each of said inverting/summing amplifiers (102);

combining said error voltage ($V_{INT}$) and said modulation voltage (Vm(i)) at the input terminal of each of said inverting/summing amplifiers (102) producing a calibrated modulation voltage (Vm(i)') at each output of said inverting/summing amplifiers (102); and driving each of said modulation electrodes (50) with said calibrated modulation voltage (Vm(i)'), thereby adjusting said instantaneous value of ion current (i) to be the uniform value of said calibrated ion current ($i_F$).

* * * * *